United States Patent
Zhu et al.

(10) Patent No.: US 7,024,871 B2
(45) Date of Patent: Apr. 11, 2006

(54) STRATEGY FOR MINIMIZING NOISE PERCEPTION IN A VEHICLE

(75) Inventors: Douglas Zhu, Canton, MI (US); Jacob Mathews, Canton, MI (US); Jeffrey Boismier, Rockwood, MI (US); James Castellano, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 10/707,480

(22) Filed: Dec. 17, 2003

(65) Prior Publication Data

US 2005/0132727 A1    Jun. 23, 2005

(51) Int. Cl.
*B60H 1/32* (2006.01)
*F25B 27/00* (2006.01)
*F25D 19/00* (2006.01)

(52) U.S. Cl. .......................... 62/133; 62/236; 62/244; 62/296; 62/178; 165/267

(58) Field of Classification Search ................. 62/133, 62/236, 239, 244, 259.2, 296, 178; 165/267
See application file for complete search history.

(56) References Cited

U.S. PATENT DOCUMENTS

| 5,937,664 | A |   | 8/1999 | Matsuno et al. |
| 5,950,440 | A | * | 9/1999 | Niimi et al. .................. 62/133 |
| 6,182,902 | B1 |  | 2/2001 | Shih |
| 6,186,254 | B1 |  | 2/2001 | Mufford et al. |
| 6,427,100 | B1 |  | 7/2002 | Kaku et al. |
| 6,450,275 | B1 |  | 9/2002 | Gabriel et al. |
| 6,467,286 | B1 |  | 10/2002 | Hasebe et al. |
| 2002/0163198 | A1 | * | 11/2002 | Gee ......................... 290/40 C |
| 2002/0183164 | A1 | * | 12/2002 | Katou et al. ................. 477/160 |
| 2003/0118891 | A1 | * | 6/2003 | Saito et al. ................... 429/62 |
| 2003/0172883 | A1 | * | 9/2003 | Shiozaki et al. ......... 123/41.12 |

* cited by examiner

*Primary Examiner*—Marc Norman
(74) *Attorney, Agent, or Firm*—Brooks Kushman P.C.; David B. Kelley

(57) ABSTRACT

The present invention provides a method for masking noise in a motor vehicle that has a component that produces noise when operated. The method of the invention comprises monitoring the speed of the vehicle, and increasing the movement of the moveable part when the vehicle is at a predetermined speed. It is well known that vehicles naturally produce more noise as the speed of the vehicle is increased. The invention also provides a noise masking system that exploits the method of the invention.

22 Claims, 6 Drawing Sheets

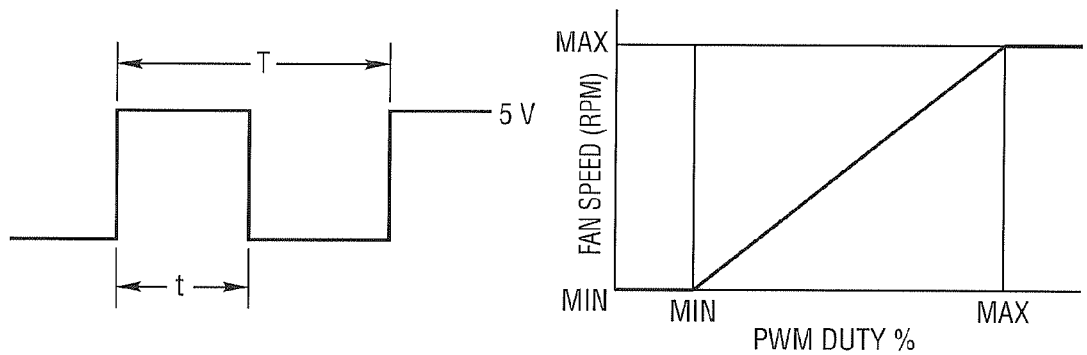
*Fig. 5a*          *Fig. 5b*
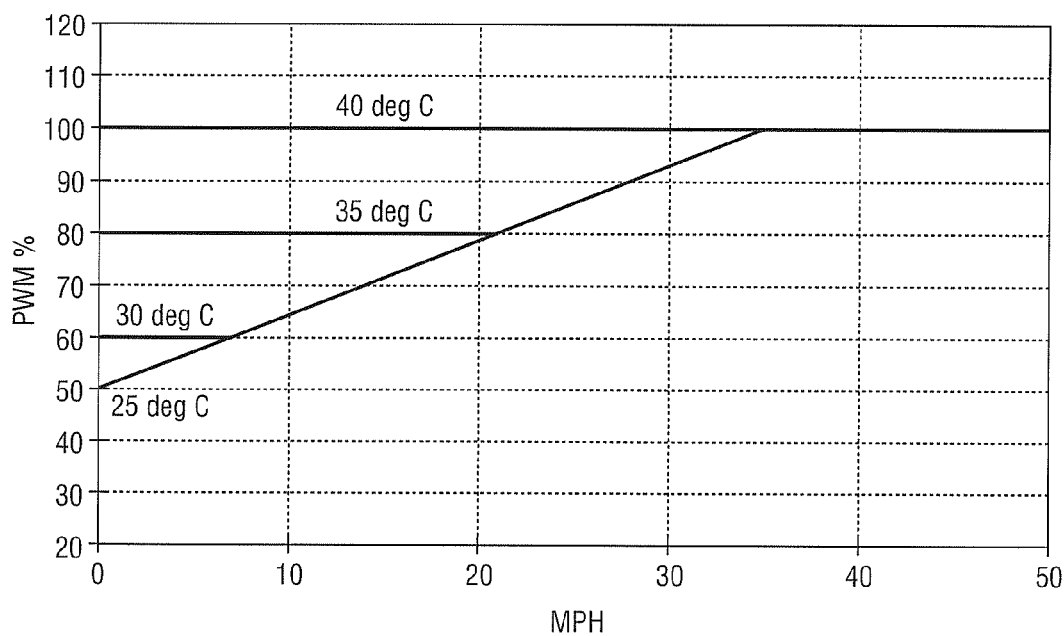
*Fig. 6a*

STRATEGY FOR MINIMIZING NOISE PERCEPTION IN A VEHICLE

BACKGROUND OF INVENTION

1. Field of the Invention

The present invention relates generally to a method of minimizing noise perception in a motor vehicle, and in particular to a method of masking the noise attributable to the battery cooling system of a hybrid electric vehicle.

2. Background Art

Governmental regulations and environmental concerns have dictated the need for automobile manufacturers to develop more fuel efficient power trains. All-electric and hybrid electric powertrains are two examples of such powertrains currently under development. Although all electric vehicles are desirable in that such vehicles offer the potential to be simply regenerated by plugging into a power outlet and may completely eliminate fossil fuel dependence, even after many years of research these vehicles are currently limited by current technology and only have a limited distance range. Hybrid electric vehicles possess increased fuel economy by combining the functionality of electric vehicles with internal combustion vehicles.

Hybrid electric vehicles ("HEVs") combine an internal combustion engine or some other primary source such as a fuel cell system with a secondary power source such as a high powered battery and electric motor. This dual powering mechanism allows HEVs to have extended range and similar refueling to fossil fuel vehicles. Presently, batteries are only able to store enough energy for short trips. Therefore, the inclusion of an internal combustion engine in HEVs allows an onboard generator to recharge the battery and to be used as a power source to run the electric engine. This combination not only leads to increased energy savings but also a decrease in undesirable automobile emissions.

There are currently various designs for hybrid electric vehicles. However, HEVs generally include primary and secondary power sources, a mechanism to propel the vehicle, and one or more energy storage devices. Power sources include internal combustion engines, gas turbines, and fuel cells. Electric motors are one type of mechanism used to propel HEVs and may be combined with a variety of transmission mechanisms, such as, planetary gear sets, CVTs, and other gearing for delivering tractive force to the vehicle's driveline. Although batteries are the most common storage devices, alternatives including ultracapacitors are possible.

The high powered batteries which are presently used tend to be quite large and bulky requiring cooling because of the high current drawn to propel a vehicle. Typically, the high powered batteries are kept cool by fans. These fans tend to produce an excessive amount of undesirable noise.

Accordingly, there exists a need for improvements in hybrid electric vehicle design. In particular, there is a need for control strategies that minimize the levels of drive-perceptible NVH attributable to battery cooling.

SUMMARY OF INVENTION

The present invention overcomes the problems encountered in the prior art by providing in one embodiment a method for reducing noise level perceived by an operator of a motor vehicle. The method of the invention includes monitoring the speed of the vehicle, and increasing the movement of a moveable component when the vehicle is at a predetermined speed. It is well known that vehicles naturally produce more noise as the speed of the vehicle is increased. Such noise is generated by the increased vehicle speed relative to the air (i.e., wind noise, road noise) and the necessarily increased noise from the engine as the vehicle moves faster. The method of the invention is advantageously applied to any automotive component that produces noise, and in particular cooling fans of the type used for cooling of high voltage battery systems in HEVs.

In another embodiment of the invention, the method of the invention is applied to a hybrid electric vehicle in which the storage battery is fan cooled. Such storage batteries tend to be bulky and require cooling for efficient operation. The method of this embodiment includes monitoring the speed of the vehicle, and increasing the movement of the fan when the vehicle is at a predetermined speed.

In yet another embodiment of the present invention, a vehicle system for masking noise in a hybrid electric vehicle utilizing the method of the invention is provided. The system of this embodiment includes a battery, a fan to cool the battery, a vehicle speed monitor, and a fan controller that receives a control signal from the vehicle speed monitor wherein the fan controller increases the duty cycle of the fan when the vehicle is at a predetermined speed.

BRIEF DESCRIPTION OF DRAWINGS

FIG. 5a is a plot of the waveform which is used to drive a cooling fan by the method of the invention;

FIG. 5b is a typical plot of the duty cycle versus fan speed for the fan used in the method of the invention;

FIG. 6a provides plots of the duty cycle versus speed of the vehicle when the engine is on;

DETAILED DESCRIPTION

Reference will now be made in detail to presently preferred compositions or embodiments and methods of the invention, which constitute the best modes of practicing the invention presently known to the inventors.

In an embodiment of the present invention, a method for masking noise in a motor vehicle is provided. Specifically, the motor vehicle includes a first automobile component that has a moveable part that produces noise when the component is moving. The method of the invention comprises monitoring the speed of the vehicle, and increasing the movement of the moveable part when the vehicle speed is greater than or equal to a predetermined speed.

Figure 1:
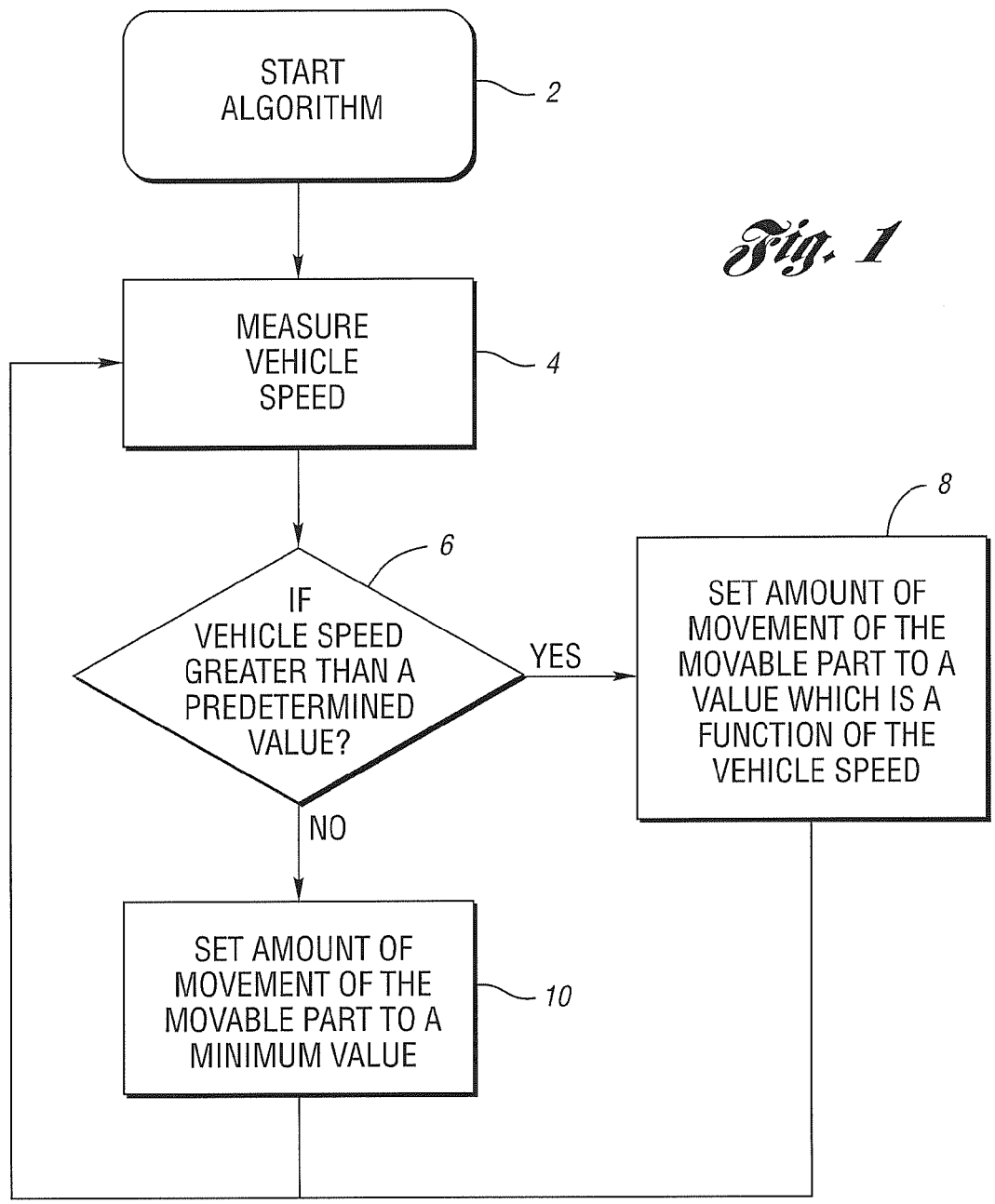
FIG. 1 is a flowchart summarizing the method of the invention.

With reference to FIG. 1, a flowchart summarizing the method of the invention is provided. The method of the invention is initiated as indicated in block 2. First, the vehicle speed is measured (block 4.) If the vehicle speed is greater than a predetermined value (block 6), the amount of movement of the moveable part is increased (block 8.) If the vehicle speed is not greater than this predetermined value, the amount of movement of the moveable part is set to a minimum value that may be zero movement (block 10.) The specifics on increasing the amount of movement are set forth below. However, it will be appreciated that the movement may be increased up to a maximum value above which the movement is no longer increased.

The method of the invention is advantageously applied to any automotive component that produces noise. Moreover, the method may be applied to any type of vehicle. Suitable types of vehicles include, for example, hybrid electric vehicles, a fuel cell vehicle, or a vehicle with an internal combustion engine. Although the invention is well suited for any component that produces noise when operated, the invention is particularly useful when the moveable component is a fan that cools a second component. Such fans are typically used to cool such automotive components as a battery or an automobile radiator. A particular important application of the invention is to cool the storage battery in a hybrid electric vehicle. Such batteries tend to be quite bulky and must be kept relatively cool to prevent damage and for maximum efficiency.

The step of increasing the movement of the moveable part when the vehicle is at a predetermined speed comprises setting the amount of movement of the moveable part to a first value when the speed is at a first value (typically, this is when the speed is zero) and then increasing the amount of movement of the moveable part as the vehicle speed increases. The amount of movement of the moveable part is typically determined by a functional relationship which is a monotonic function of the vehicle speed. More preferably, this monotonic functional relationship is a linear relationship. Any measure of movement of the moveable part may be used such as duty cycle, rpms, and the like.

For example, when the moveable component is a fan, the step of increasing the movement of the moveable part when the vehicle is at a predetermined speed comprises setting the duty cycle of the fan to a first duty cycle value when the speed of the vehicle is zero, and monotonically increasing the duty cycle as the speed of the vehicle increases until the duty cycle reaches a second duty cycle value. In particular, the movement of the moveable part when the vehicle is at a predetermined speed comprises setting the duty cycle of the fan to a first duty cycle value when the speed of the vehicle is zero, and linearly increasing the duty cycle as the speed of the vehicle increases until the duty cycle reaches a second duty cycle value. Typically, this second duty cycle value is 100%.

Figure 2:
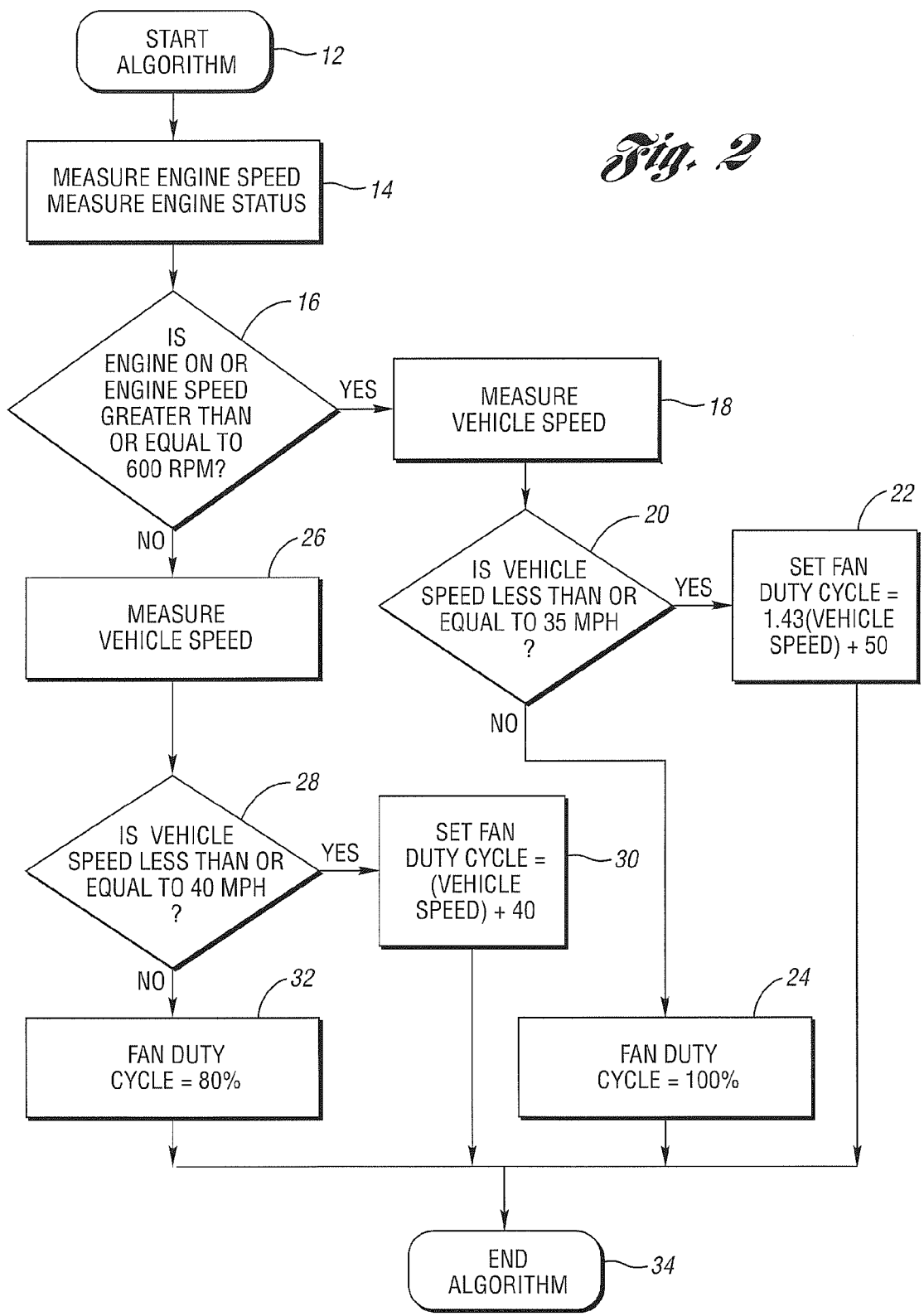
FIG. 2 is a flowchart summarizing the method of the invention when the first automobile component with a moveable part is a fan ("the speed algorithm)

With reference to FIG. 2, a flowchart summarizing the method of the invention for when the moveable part is a fan is provided. Block 12 indicates that the method of the invention ("the speed algorithm") has been initiated. The engine's speed (i.e., rpm) and the engine status (i.e., is the engine turned on) is measured (Block 14.) Decision point 16 is performed if either the engine is turned on or the engine rpm is greater than or equal to 600 rpm then the vehicle speed is measured as indicated by block 18. If the vehicle speed is less than or equal to 35 mph (block 20), the fan duty cycle is set to 1.43 (vehicle speed)+50 as indicated in block 22. If the engine speed is greater than 35 mph the fan duty cycle is set to 100% (block 24). The method of this embodiment also contemplates the situation when both the engine is off with an engine speed that is less than 600 rpm (Block 16.) In this scenario, the vehicle speed is measured (Block 26.) If the vehicle speed is less than or equal to 40 mph (block 28), then the fan duty cycle is set to (vehicle speed)+40 as indicated in block 30. If the vehicle speed is greater than 40 mph then the fan duty cycle is set to 80% (block 32.)

When the moveable component is a fan, the method of the invention optionally further comprises monitoring the temperature of the second automobile component (which is cooled by the fan), and increasing the movement of the fan when the temperature reaches a predefined value irrespective of the vehicle speed. Preferably, the duty cycle of the fan is set to a first duty cycle value when the temperature of the second automobile component is equal to or below a first temperature value, and monotonically increasing the duty cycle as the temperature of the second component increases until the duty cycle reaches a second duty cycle value. More preferably, the duty cycle is monotonically increased by linearly increasing the duty cycle as the temperature of the second component increases until the duty cycle reaches a second duty cycle value. Typically, this second duty cycle value is 100%.

Figure 3:
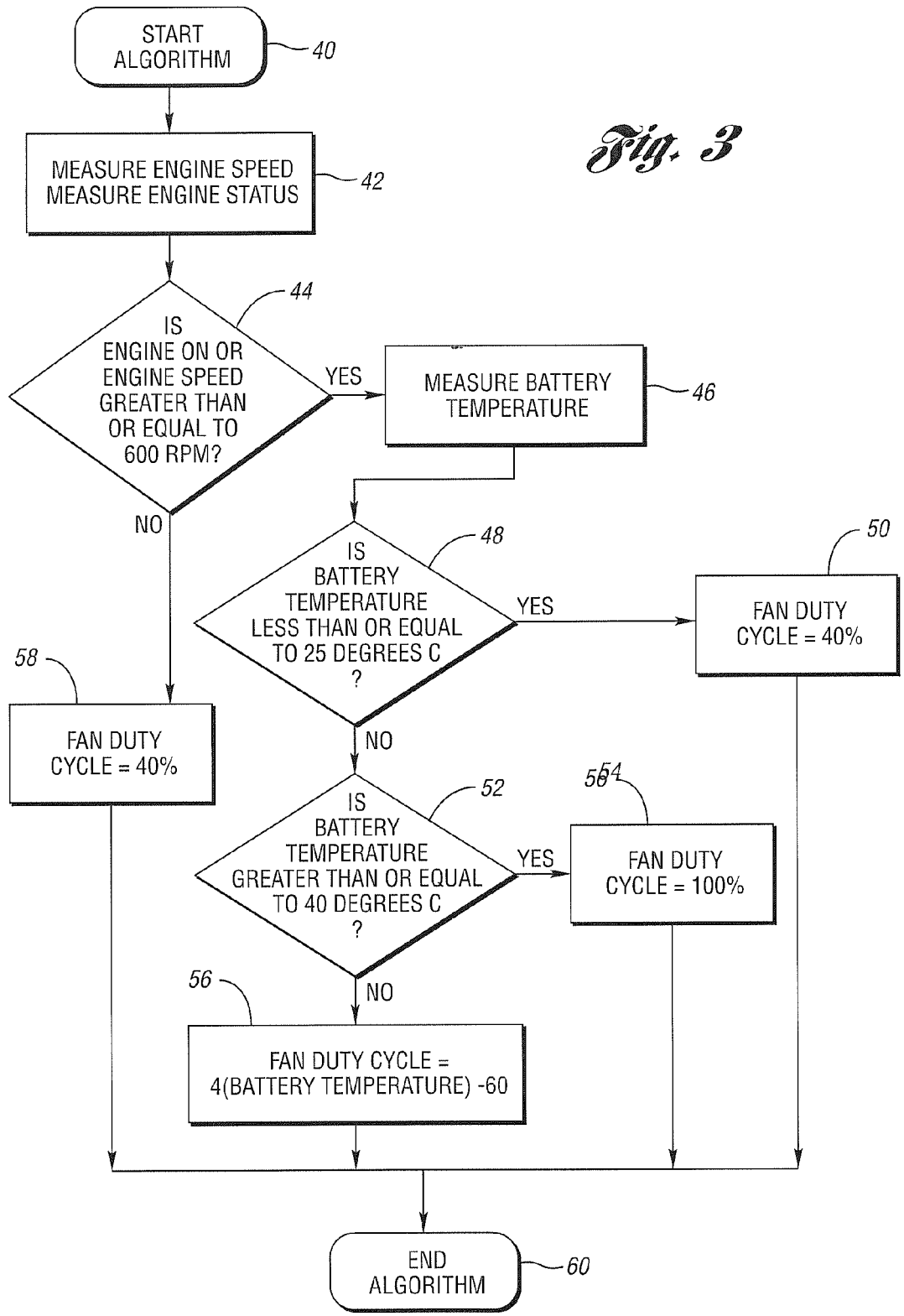
FIG. 3 is a flowchart summarizing a variation of the invention when the temperature of a second component cooled by a fan is monitored ("the temperature algorithm")

With reference to FIG. 3, a flowchart summarizing the method in which the temperature of the second component is monitored ("the temperature algorithm"). This method is initiated as indicated by block 40. The engines speed (i.e., rpm) and the engine status (i.e., is the engine turned on) is measured (Block 42.) If either the engine is turned on or the engine rpm is greater than or equal to 600 rpm (block 44), then the battery temperature is measured as indicated by block 46. If the battery temperature is less than or equal to 25 degrees C. (block 48) then the duty cycle is set to 40% (block 50.) If the battery temperature is greater than or equal to 25 degrees C. then the decision block 52 is implemented. In block 52 it is determined whether the battery temperature is greater than or equal to 40 degrees C. If this condition is true then the fan duty cycle is set to 100% (block 54.) If this condition is not met, the fan duty cycle is set to 4 (battery temperature) −60 as indicated in block 56 where the temperature is expressed in degrees Centigrade. The method of this embodiment also contemplates the situation where the engine is off or the engine speed is less than 600 rpm. In this scenario, the fan duty cycle is set to 40%. Block 60 indicates the end of algorithm.

Figure 4:
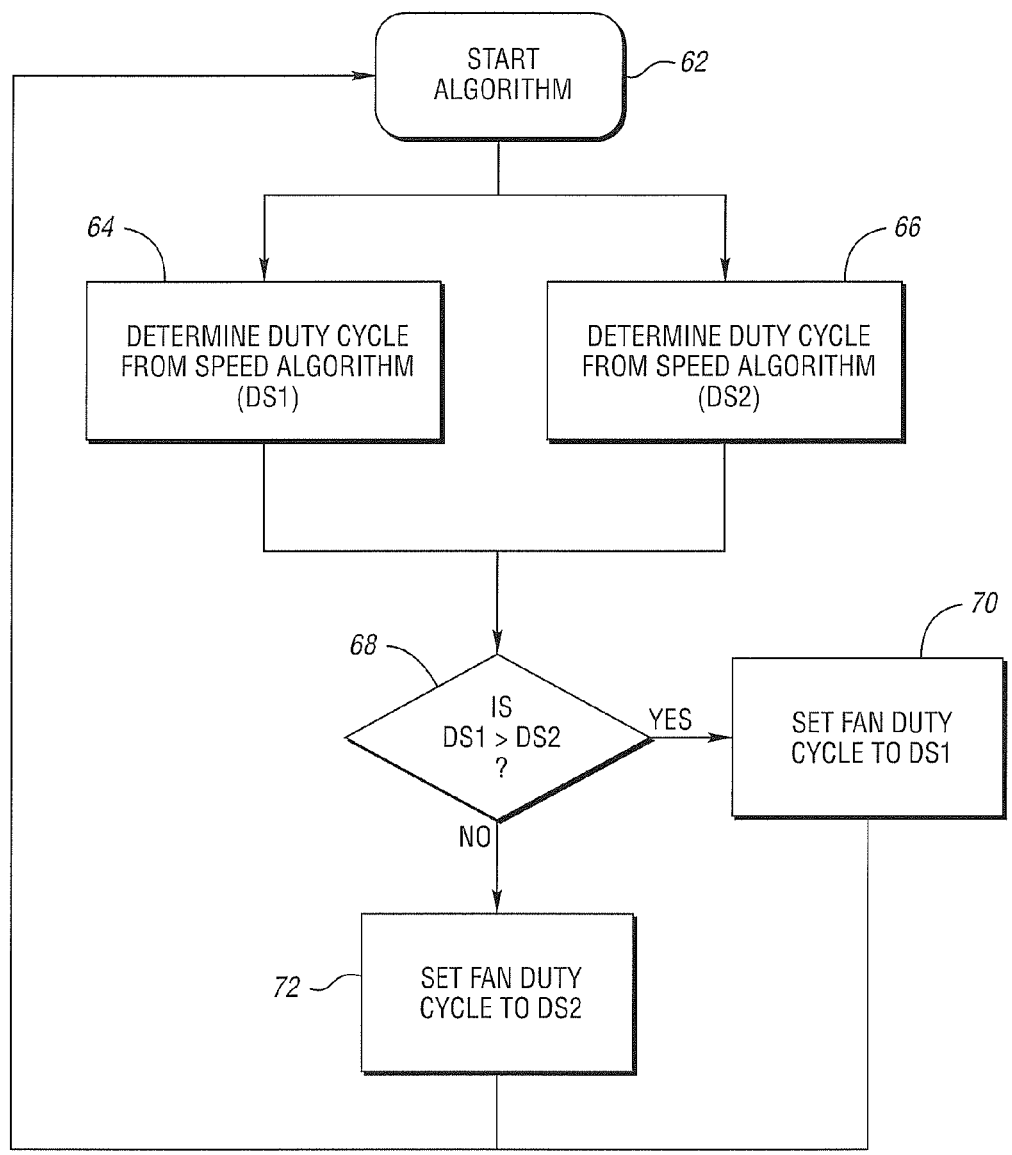
FIG. 4 is a flowchart summarizing the combined use of the speed algorithm of FIG. 2 and the temperature algorithm of FIG. 3.

With reference to FIG. 4, a flowchart demonstrating the combined use of the speed algorithm and the temperature algorithm is provided. Block 62 indicates the initiation of the algorithms. In block 64 the speed algorithm of FIG. 2 is executed to determined a first fan duty cycle ("DS1") and in block 66 the temperature algorithm of FIG. 3 is executed to determine a second fan duty cycle ("DS2"). If DS1 is greater than DS2 (block 68) then the fan duty cycle is set to DS1 (block 70). If DS1 is not greater than DS2 then the fan duty cycle is set to DS2. As indicated in FIG. 2, this algorithm may be repeated.

With reference to FIGS. 5a and b, the parameters which define the duty cycle are provided. The fan speed is preferably controlled via electrical pulse modulation ("PWM"). The cooling fan is driven with the voltage waveform described in FIG. 1a. The voltage waveform is defined by period T. Moreover, the fan will be driven by the applied voltage for time t. Accordingly, the duty cycle expressed as a percentage is defined by equation 1:

$$\text{fan PWM duty} = t/T * 100\% \qquad 1$$

Figure 6B:
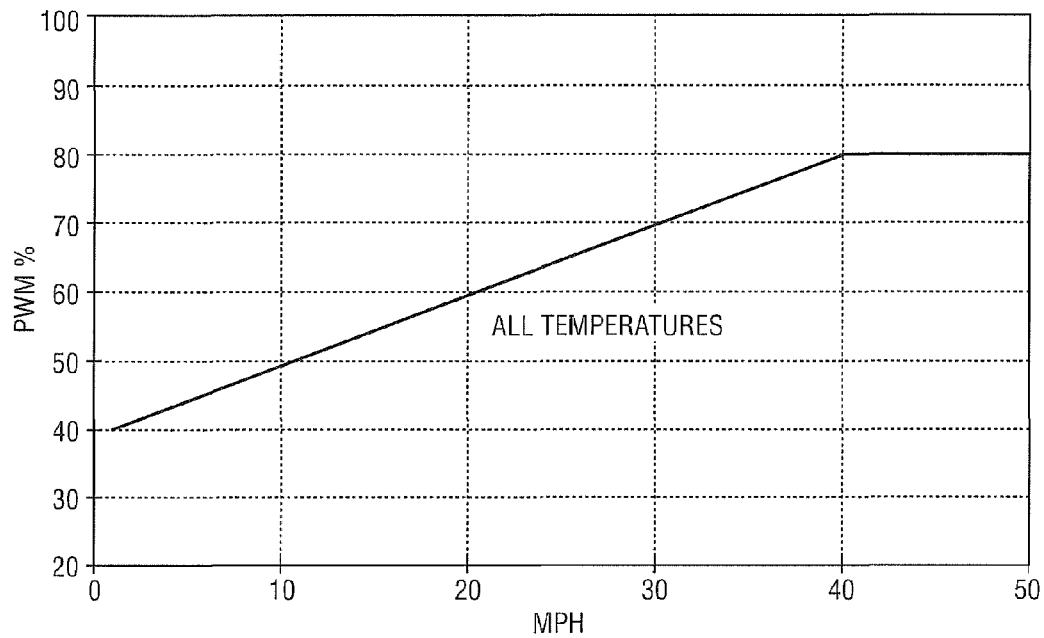
FIG. 6b provides plots of the duty cycle versus speed of the vehicle when the engine is off.

FIG. 5b provides a plot of the fan speed versus duty cycle from a constant minimum up to a constant maximum. With reference to FIG. 6a and b plots of the duty cycle versus speed of the vehicle with the engine on and off are provided. In each plot, the duty PWM duty is increased from a minimum value to a maximum value and then it levels off. Plots for different battery temperatures are provided in the plots. When the engine is on, it is observed that speed at which the fan is allowed to operate at 100% (which makes the most noise) is approximately 35 mph when the battery temperature is below 40 degree C. For higher battery temperatures the minimum fan PWM duty will start at decreased speeds. Similarly, in FIG. 6b, similar types of plots for an engine off condition is provided. Here, since the engine is off, the speeds at which maximal fan PWM duty is allowed is shifted to a larger value, or leveled off at a smaller maximum. This is because the engine sound is not available to mask the fan speed.

In a particularly preferred embodiment of the present invention, a method of masking noise in a hybrid electric vehicle is provided. In this embodiment the hybrid electric vehicle includes a fan to cool the storage battery in the vehicle. The method of this embodiment comprises monitoring the speed of the vehicle, and increasing the movement of the fan when the vehicle is at a predetermined speed. The movement of the fan is preferably adjusted by setting the duty cycle of the fan to a first duty cycle value when the speed of the vehicle is zero, and monotonically increasing the duty cycle as the speed of the vehicle increases until the duty cycle reaches a second duty cycle value. The preferable method of monotonically increasing the duty cycle of the fan is by linearly increasing the duty cycle as the speed of the vehicle increases until the duty cycle reaches a second duty cycle value. The method of this embodiment further comprises monitoring the temperature of the second automobile component, and increasing the movement of the fan when the temperature reaches a predefined value irrespective of the vehicle speed. As set forth above more generally, the step of increasing the movement of the fan when the vehicle is at a predetermined speed comprises setting the duty cycle of the fan to a first duty cycle value when the temperature of the second automobile component is equal to or below a first temperature value, and monotonically increasing the duty cycle as the temperature of the second component increases until the duty cycle reaches a second duty cycle value. Again, the method of monotonically increasing the duty cycle comprises linearly increasing the duty cycle as the temperature of the second component increases until the duty cycle reaches a second duty cycle value. When a HEV battery is being cooled as in this embodiment, preferably, the first temperature value is from about 25 degree C. to about 40 degree C., the first duty cycle value is from about 30% to about 100%, and the second duty cycle is from 70% to 100%.

In still another embodiment of the present invention, a system for masking noise in a hybrid electric vehicle utilizing the method of the invention is provided. The system of this embodiment comprises a battery, a fan to cool the battery, a vehicle speed monitor, and a fan controller that receives a control signal from the vehicle speed monitor wherein the fan controller increases the duty cycle of the fan when the vehicle is at a predetermined speed. The fan controller after receiving vehicle speed information from the speed sensor, sets the duty cycle of the fan to a first duty cycle value when the speed of the vehicle is zero and monotonically increases the duty cycle as the speed of the vehicle increases until the duty cycle reaches a second duty cycle value. The system of the invention will typically further comprise a temperature monitor that determines the temperature of the battery and sends a control signal to the fan controller wherein the fan controller increases the duty cycle of the fan when the temperature reaches a predefined value irrespective of the vehicle speed. Moreover, the fan controller sets the duty cycle of the fan to a first duty cycle value when the temperature of the battery is equal to or below a first temperature value and monotonically increases the duty cycle as the temperature of the second component increases until the duty cycle reaches a second duty cycle value.

Figure 7:
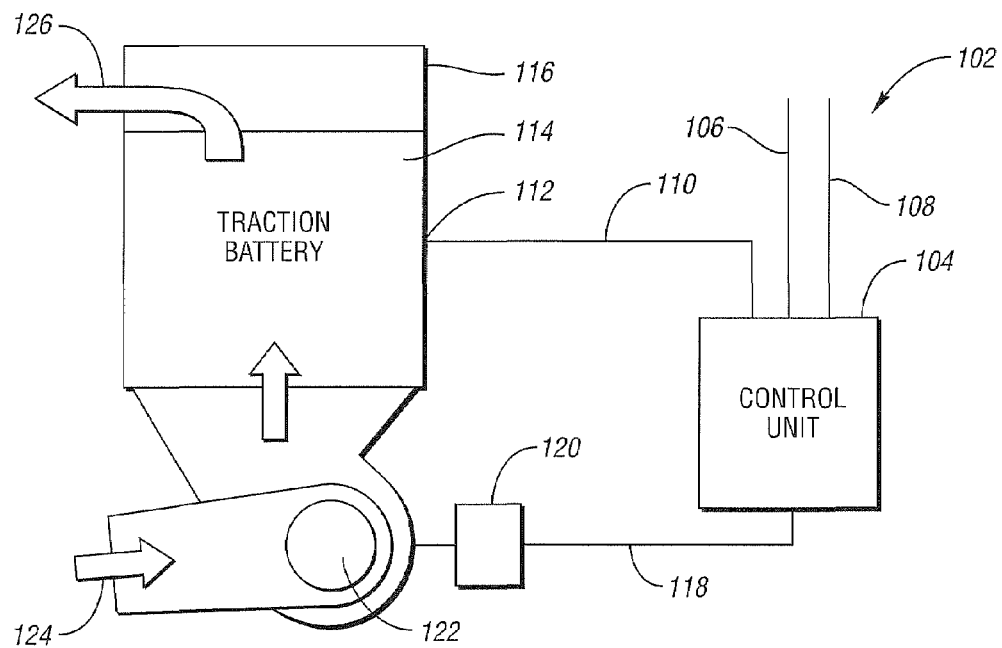
FIG. 7 is a schematic of the battery cooling system of the invention.

With reference to FIG. 7, a schematic of the system of the present invention is provided. System 102 includes control unit 104 which senses the engine status via input 106 and the vehicle speed via input 108. Furthermore, control unit 104 senses the battery temperature via input 110 which measures the temperature of position 112 in the vicinity of battery 114 that is housed in battery housing 116. Upon sensing that the temperature of battery 114 has fallen below a preset temperature, control unit 104 sends a signal via output 118 to relay 120 that activates fan 122 to blow air over battery 114. Air enters fan 122 at air inlet 124. The air cools battery 114 as it proceeds over it and exits out of the battery compartment at air outlet 126.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

The invention claimed is:

1. A method for masking noise in a motor vehicle having a first automobile component having a moveable part that produces noise and an engine, the method comprising:
    measuring the speed of the engine speed and the engine status as being turned on;
    if the speed of the engine is greater than a predetermined engine speed or if the engine is turned on measuring the speed of the vehicle; and
    increasing the movement of the moveable part when the vehicle is at a predetermined speed, wherein the step of increasing the movement of the moveable part when the vehicle is at a predetermined speed comprises:
    setting the amount of movement of the moveable part to a first value when the speed of the vehicle is zero; and
    increasing the amount of movement as the vehicle speed increases.

2. The method of claim 1 wherein the step of increasing the movement of the moveable part when the vehicle is at a predetermine speed comprises:
    setting the amount of movement of the moveable part to a first value when the speed of the vehicle is zero; and
    linearly increasing the amount of movement of the moveable part as the speed of the vehicle increases.

3. The method of claim 1 wherein the first automobile component is a fan.

4. The method of claim 3 wherein the fan cools a second automobile component.

5. The method of claim 4 wherein the second automobile component is a battery or a radiator.

6. The method of claim 5 further comprising:
    monitoring the temperature of the second automobile component; and
    increasing the movement of the fan when the temperature reaches a predefined value irrespective of the vehicle speed.

7. The method of claim 6 wherein the step of increasing the movement of the moveable part when the temperature reaches a predefined value comprises:

setting the duty cycle of the fan to a first duty cycle value when the temperature of the second automobile component is equal to or below a first temperature value; and monotonically increasing the duty cycle as the temperature of the second component increases until the duty cycle reaches a second duty cycle value.

8. The method of claim 6 wherein the step of increasing the movement of the moveable part when the vehicle is at a predetermine speed comprises:

setting the duty cycle of the fan to a first duty cycle value when the temperature of the second automobile component is equal to or below a first temperature value; and linearly increasing the duty cycle as the temperature of the second component increases until the duty cycle reaches a second duty cycle value.

9. The method of claim 1 wherein the motor vehicle is a hybrid electric vehicle, a fuel cell vehicle, or a vehicle with an internal combustion engine.

10. The method of claim 1 wherein the motor vehicle is a hybrid electric vehicle.

11. The method of claim 1 wherein the predetermined engine speed is greater than 600 rpm.

12. A method for masking noise in a hybrid electric vehicle having a fan to cool a battery, the method comprising:

measuring the speed of the engine speed and the engine status as being turned on;

if the speed of the engine is greater than 600 rpm or if the engine is turned on measuring the speed of the vehicle; and increasing the movement of the fan when the vehicle is greater than or equal to a predetermined speed.

13. The method of claim 12 wherein the step of increasing the movement of the fan when the vehicle is at a predetermined speed comprises:

setting the duty cycle of the fan to a first duty cycle value when the speed of the vehicle is zero; and monotonically increasing the duty cycle as the speed of the vehicle increases until the duty cycle reaches a second duty cycle value.

14. The method of claim 12 wherein the step of increasing the movement of the fan when the vehicle is at a predetermined speed comprises:

setting the duty cycle of the fan to a first duty cycle value when the speed of the vehicle is zero; and linearly increasing the duty cycle as the speed of the vehicle increases until the duty cycle reaches a second duty cycle value.

15. The method of claim 12 further comprising:

monitoring the temperature of the second automobile component; and increasing the movement of the fan when the temperature reaches a predefined value irrespective of the vehicle speed.

16. The method of claim 15 wherein the step of increasing the movement of the fan when the temperature reaches a predefined value comprises:

setting the duty cycle of the fan to a first duty cycle value when the temperature of the second automobile component is equal to or below a first temperature value; and monotonically increasing the duty cycle as the temperature of the second component increases until the duty cycle reaches a second duty cycle value.

17. The method of claim 15 wherein the step of increasing the movement of the fan when the vehicle is at a predetermine speed comprises:

setting the duty cycle of the fan to a first duty cycle value when the temperature of the second automobile component is equal to or below a first temperature value; and linearly increasing the duty cycle as the temperature of the second component increases until the duty cycle reaches a second duty cycle value.

18. The method of claim 17 wherein the first temperature value is from about 25° C. to about 40° C., first duty cycle value is from about 30% to about 100%, and the second duty cycle value is from 70% to 100%.

19. A system for masking noise in a hybrid electric vehicle, the system comprising:

a battery;

a fan to cool the battery;

a control unit which senses the engine status and the vehicle speed;

a fan controller that receives a control signal from the vehicle speed monitor wherein the fan controller increases the duty cycle of the fan when the vehicle is at a predetermined speed and when the engine status is such that the engine is turned on.

20. The system of claim 19 wherein the fan controller sets the duty cycle of the fan to a first duty cycle value when the speed of the vehicle is zero and monotonically increases the duty cycle as the speed of the vehicle increases until the duty cycle reaches a second duty cycle value.

21. The system of claim 19 further comprising a temperature monitor that determines the temperature of the battery and sends a control signal to the fan controller wherein the fan controller increases the duty cycle of the fan when the temperature reaches a predefined value irrespective of the vehicle speed.

22. The system of claim 21 wherein the fan controller sets the duty cycle of the fan to a first duty cycle value when the temperature of the battery is equal to or below a first temperature value and monotonically increases the duty cycle as the temperature of the second component increases until the duty cycle reaches a second duty cycle value.

* * * * *